US006844898B1

(12) United States Patent
Conrads et al.

(10) Patent No.: US 6,844,898 B1
(45) Date of Patent: Jan. 18, 2005

(54) IMAGE DETECTOR

(75) Inventors: Norbert Conrads, Raeren (BE); Ulrich Schiebel, Aachen (BE); Herfried Karl Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 829 days.

(21) Appl. No.: 09/606,354

(22) Filed: Jun. 29, 2000

(30) Foreign Application Priority Data

Jul. 5, 1999 (EP) .......................................... 99202289

(51) Int. Cl.⁷ .......................... H04N 5/335; H04N 3/14
(52) U.S. Cl. ................................... 348/308; 250/208.1
(58) Field of Search ....................... 250/208.1; 378/98.8

(56) References Cited

U.S. PATENT DOCUMENTS 4,930,006 A    5/1990  Murayama et al.
5,410,146 A  * 4/1995  Hur ........................... 250/208.1
5,965,892 A  * 10/1999 Tanaka ..................... 250/370.08
5,973,311 A  * 10/1999 Sauer et al. ............... 250/208.1

FOREIGN PATENT DOCUMENTS

EP           0055592 A2    7/1982
EP           0440282 A2    8/1991

* cited by examiner

*Primary Examiner*—Tuan Ho
*Assistant Examiner*—Yogesh Aggarwal
(74) *Attorney, Agent, or Firm*—John Vodopia

(57) ABSTRACT

An image detector includes a sensor matrix with a plurality of sensor elements for converting radiation into electrical charges and with several line conductors. The sensor elements are arranged in columns and rows. Separate sensor elements are coupled to at least one of the line conductors. Separate groups of sensor elements in one column and/or in one row of the matrix are coupled to different line conductors and at least one line conductor is coupled to sensor elements of at least two columns or of at least two rows.

17 Claims, 1 Drawing Sheet

IMAGE DETECTOR

BACKGROUND OF THE INVENTION

The invention relates to an image detector having
a sensor matrix which includes
plurality of sensor elements for converting radiation into electrical charges,
several line conductors,
separate sensor elements being coupled to at least one of the line conductors, and
the sensor elements being arranged in columns and rows.
The invention also relates to an X-ray examination apparatus including
an X-ray source for emitting an X-ray beam and
an X-ray detector for receiving an X-ray image and deriving an image signal from the X-ray image.

The image detector derives an image signal from an image, the signal levels of the image signal representing brightness values of the image. When radiation, such as light or X-rays, is incident on the sensor elements, electrical charges are generated in the sensor elements. The quantity of the electrical charge in individual sensor elements corresponds to the intensity of the radiation that is incident on the relevant sensor element. The electrical charges in the sensor elements are detected, i.e. read-out, along the read-lines and the image signal is formed from the read-out electrical charges. The signal levels of the image signal correspond to the electrical charges and hence to the radiation intensities received at the respective sensor elements. The signal levels of the image signal thus correspond to the brightness values of the image such as a visible image or an X-ray image.

Such an X-ray examination apparatus and such an image detector are known from the patent U.S. Pat. No. 5,184,018.

In the known image detector all sensor elements in individual columns are coupled to a single read-line and all sensor elements in individual rows are coupled to a single addressing line. Should one of the read-lines and/or one of the addressing lines in the known image detector become defective, a serious error would occur in the image signal. More specifically a defect in a read-line or in an addressing-line, causes the exclusion of the brightness values of an entire vertical or horizontal line in the image from the image signal. It has been found that it is very difficult to correct this error in the image signal and that, after an attempt to correct the image signal, a substantial residual error remains. As an alternative for the known image image sensor there are provided two read-lines per column, the different read-lines carrying the collected charges to opposite sides of the substrate of the image sensor.

OBJECTS AND SUMMARY OF THE INVENTION

It is an object of the invention to provide an image detector with a sensor matrix having line conductors, such as read-lines and/or addressing lines, which is less susceptible to faults in the line conductors, in particular in the read-lines and/or addressing lines (line faults) as compared to the known image detector. It is in particular an object of the invention to provide an image detector in which erroneous signal levels due to such line faults can be corrected.

This object is achieved by an image detector according to the invention which is characterized in that
separate groups of sensor elements in one column and/or in one row of the matrix are coupled to different line conductors, and
at least one line conductor is coupled to sensor elements of at least two columns or of at least two rows.

The sensor elements convert incident radiation, such as visible light, infrared or ultraviolet radiation or X-radiation, into electrical charges. For example, the sensor elements are photodiodes, phototransistors or photo-conducting elements. The sensor elements are coupled to the line conductors by way of switching elements. The line conductors may be read lines for detecting the electrical charges in the sensor elements. The line conductors may also be addressing lines for applying control signals to the switching elements. The input port of an individual switching element is electrically connected to the sensor element at issue and the output port of this switching element is electrically connected to the relevant read-line. Individual switching elements have respective control ports; switching elements are electrically connected to the relevant addressing lines via their respective control ports. For example, thin-film transistors (TFTs) are employed as the switching elements. Each individual TFT has its source contact electrically connected to the sensor element at issue; the drain contact of the relevant TFT is electrically connected to the relevant read line and the gate contact of the relevant TFT is electrically connected to the relevant addressing line.

According to the invention, not all sensor elements in individual columns and/or in individual rows are coupled to the same line conductor. A defective line conductor fails to convey correctly electrical signals such as the control signals for the switching elements or electrical signals concerning the detection of the electrical charges in the sensor elements. Should a line conductor be defective, it is thus achieved that not the entire column or row of the sensor matrix is rendered useless as a substantial number of sensor elements in the column and/or row at issue is still being coupled to another line conductor. In particular, defects in one line conductor in the image detector of the invention cause only small errors in the image signal. Such defects are caused, for example, by an electrical interruption or a high leakage current in the line conductor at issue or a high leakage current due to one or several defective sensor elements. Defects in a relevant channel of the driver IC for the read-line at issue also causes only small, easily correctable errors in the signal levels of the image signal. Furthermore, one or several line conductors are coupled to sensor elements in several columns or rows. This architecture ensures that erroneous signal levels due to a defective line conductor are closely surrounded by correct signal levels in the image signal. Furthermore, this architecture requires only a reasonable number of line conductors; notably the number of read-lines is one more than the number of columns and the number of addressing lines is one more than the number of rows. Hence, even for image detectors with a large number of columns and rows the number of line conductors is only two more than the sum of the number of columns and the number of rows.

These and other aspects of the invention will be further elaborated with reference to the embodiments of the invention as defined in the dependent claims.

In an embodiment of the invention, preferably not all sensor elements in individual columns of the sensor matrix are coupled to the same read-line, but some sensor elements in one column are coupled to one of the read-lines and other sensor elements are coupled to another one of the read-lines. Thus, in individual columns there are several column-groups of sensor elements, the sensor elements in respective column-groups are being coupled to respective read-lines. Should one read-line be defective, then only a portion of the electrical charges in the sensor elements in the column at issue, viz. the sensor elements coupled to the defective read-line, cannot be read out. Nevertheless, another portion of the electrical charges in the sensor elements in the column at issue, viz. the column involving the defective read-line, can still be read out as a number of sensor elements in the column at issue is coupled to a different read-line. Hence, not all signal levels in the image signal pertaining to the column at issue are lost: the signal levels pertaining to the electrical charges from the sensor elements in the column at issue that are coupled to a non-defective read-line are still available. Thus, only the signal levels of the sensor elements of one column-group are lost whereas the signal levels from sensor elements in one or more column-groups in the column at issue are still available. Thus, should one read-line be defective, only relatively small errors occur will in the signal levels of the image signal. Such small errors are easily corrected. For example, an erroneous signal level due to a sensor element that is coupled to the defective read-line can be corrected by interpolation of signal levels due to sensor elements adjacent to the sensor element that produced the erroneous signal level.

It is another object of the invention to provide an X-ray examination apparatus with an image detector which is less susceptible to defects in the line conductors such as the read lines and/or the addressing lines. This object is achieved by the X-ray examination apparatus according to the invention as defined in claim 9. The X-ray examination apparatus according to the invention in particular provides an image signal which represents image information of an X-ray image that is formed on the X-ray detector. Notwithstanding a small number of defective line conductors, the image signal, possibly after small and simple corrections, can be used to display the image information of the X-ray image with a high diagnostic quality.

Preferably, within individual columns the sensor elements are coupled to respective adjacent read-lines in an alternating fashion. That is, in individual columns of the sensor matrix next-nearest neighbouring sensor elements are coupled to the same read-line and neighbouring sensor elements are coupled to different read-lines. In other words, within an individual row of the matrix there are several row-groups of sensor elements, sensor elements of respective row-groups being coupled to respective read-lines. Should one read-line fail, i.e. be defective, many sensor elements in the relevant column will still be coupled to another read-line which is not defective. Thus, only the signal levels from the sensor elements in the row-group involving the defective read-line are lost. Hence a substantial portion, i.e. about half, of the signal levels pertaining to the column at issue is correctly read out via one or more read-lines that are not defective. Thus, the defective read-line gives rise to a small error only in the image signal. Moreover, correct signal levels are available due to sensor elements that are not coupled to the defective read-line at issue and located close to, preferably neighbouring, the sensor element causing the erroneous signal level. Consequently, the erroneous signal level is easily and accurately corrected on the basis of correct signal levels from the sensor elements close to the sensor element that is coupled to the defective read-line. Such a correction is preferably carried out by interpolation of the correct signal levels so as to accurately reconstruct the signal levels due to sensor elements coupled to the defective read-line at issue.

In a preferred embodiment of the image detector of the invention, in individual rows of the sensor matrix a number of sensor elements is coupled to the same read-line. Preferably, in individual rows groups of two sensor elements are coupled to respective read-lines, the (both) sensor elements of separate groups being coupled to the same relevant read-line.

In another embodiment of an image detector according to the invention, not all switching elements in individual rows of the sensor matrix are coupled to the same addressing line. Thus, there are several row-sections in individual rows, switching elements of sensor elements in respective row-sections being coupled to respective addressing lines. Should one addressing line be defective in that is does not correctly convey the control signals to the switching elements coupled to the addressing line at issue, a substantial portion, for example, about half, of the switching elements in the row at issue can still be addressed by way of the control signals. This is because this substantial portion of switching elements is coupled to another addressing line. Only the switching elements in the row-section involving the defective addressing line cannot be activated. Thus, in case one addressing line is defective, only a relatively small number of switching elements cannot be controlled. It is thus achieved that a defective addressing line gives rise to a small error only in the signal level of the image signal.

Preferably, the row-sections are formed such that alternating sensor elements are included in different row portions. In particular, within individual rows switching elements of alternating sensor elements are coupled to alternating addressing lines. Furthermore, preferably in individual columns the switching elements of sensor elements in the same column-section are coupled to the same addressing line. In individual columns the column-sections are notably formed by adjacent sensor elements. Preferably, such columns sections with a pair of sensor elements that are adjacent in individual columns are arranged such that the column-sections in neighbouring columns are shifted one sensor element with respect to one another. These schemes of coupling the switching elements to the addressing lines offer the advantage that should only one or just a few addressing lines be defective, only minor errors will be caused in the signal levels of the image signal. Such minor errors are often insignificant or can be easily and accurately corrected. Consequently, the possibly corrected image signal represents the image information of the image with a high diagnostic quality, implying that small details of low contrast are rendered well visible when the image is displayed on the basis of the (corrected) image signal.

Preferably, the image detector according to the invention is provided with a pre-processor unit which receives the image signal and is arranged to correct the image signal on the basis of the signal levels of the image signal itself so as to correct small errors due to defective read-lines and/or defective addressing lines. The pre-processor unit is notably arranged to compute interpolations of signal levels corresponding to neighbouring sensor elements so as to compute corrected signal levels.

These and other aspects of the invention will be elucidated with reference to the embodiments described hereinafter and with reference to the accompanying drawing; therein:

DESCRIPTION OF THE PREFERRED EMBODIMENTS

Figure 1:
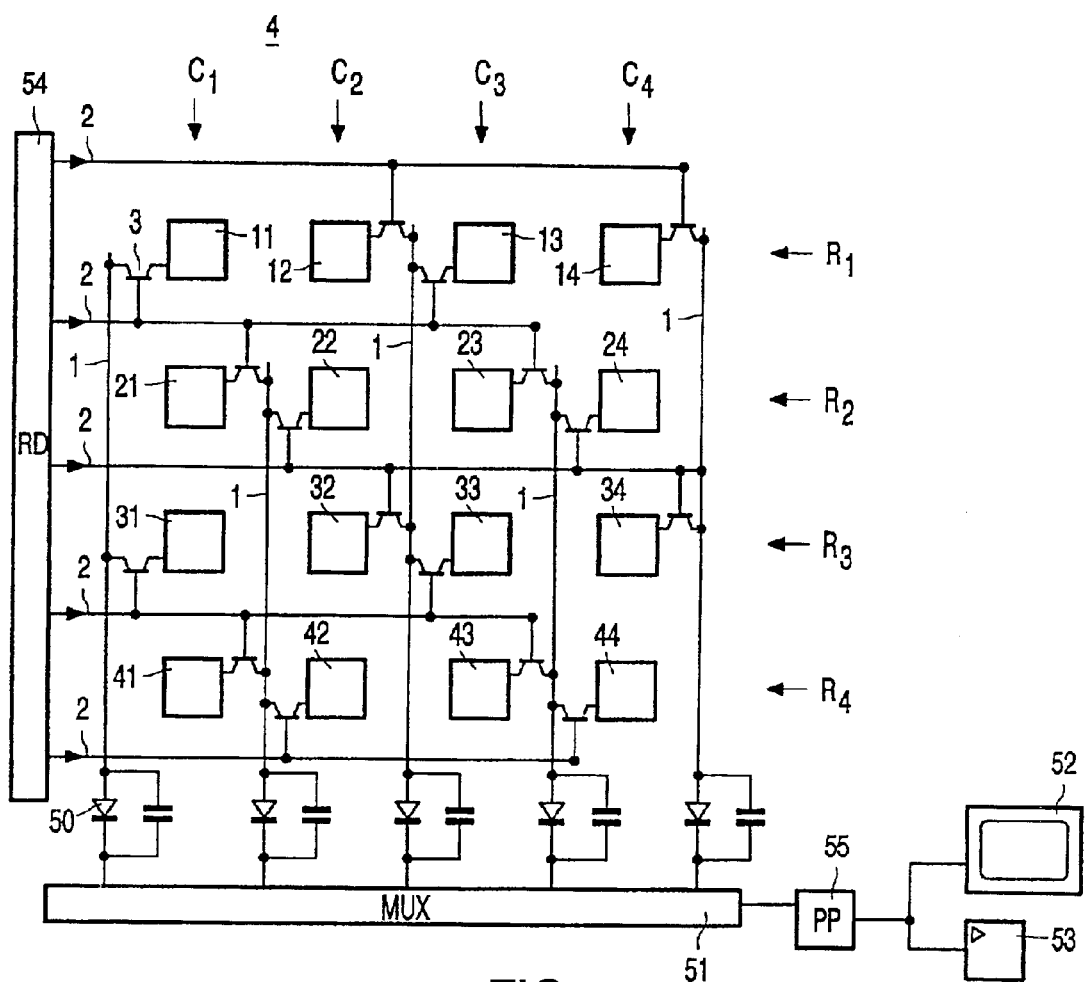
FIG. 1 is a schematic representation of the image detector according to the invention.

FIG. 1 is a schematic representation of the image detector according to the ice invention. FIG. 1 shows an image detector with a 4×4 matrix of sensor elements (11–33) by way of example. In practice, however, much larger sensor matrices may be employed, notably comprising 1024×1024, 4096×4096 or 3072×4096 sensor elements. The sensor elements are arranged in rows and columns; specifically, the sensor elements 11,12,13,14 form the row R1, the sensor elements 21,22,23,24 form the row R2, the sensor elements 31,32,33,34 form the row R3 and the sensor elements 41,42,43,44 form the row R4. Furthermore, the sensor elements 11,21,31,41 form the column C1, the sensor elements 12,22,32,42 form the column C2, the sensor elements 13,23,33,43 form the column C3 and the sensor elements 14,24,34,44 form the column C4. The sensor elements are sensitive to incident radiation in that the incident radiation forms electrical charges in the sensor elements. For example, each sensor element includes a semi-conductor (pin) photodiode or photoconductor which is sensitive to the incident radiation. The image detector 4 comprises line conductors, such as read-lines 1, which extend in the direction of the columns and addressing lines 2 which extend in the direction of the rows. The individual sensor elements (11–44) are coupled to respective read-lines by means of thin-film transistors 3. The thin-film transistors 3 are closed, i.e. rendered electrically conductive, by applying the control signals, via the addressing lines, to the gate contacts of the thin-film transistors. When the thin-film transistor of an individual sensor element is closed, the sensor element (e.g. its photodiode) is electrically conductively connected to the relevant read-line 1 so that the electrical charge in the sensor element is detected (i.e. read-out). To this end, the individual read-lines are coupled to respective read amplifiers 50 which are arranged as charge integrating amplifiers. At the output of the read amplifiers 50 electrical read signals, notably read voltages, are generated. The signal levels of the read voltages represent the electrical charges that are successively detected in the sensor elements (11, 12, . . . 43—43) coupled to the respective read-lines 1. The read voltages are applied to a multiplex circuit 51 which derives the image signal in the form of a serial signal from the read voltages. For example, the image signal is an electronic video signal whose signal levels represent the brightness values of the image. The image signal (IS) is applied to a monitor 52 in order to display the image or is applied to a buffer unit 53. From the buffer unit the image signal can be recalled for further (image) processing or for producing a hard-copy of the image.

The control signals for the thin-film transistors are generated by a row-driver circuit 54. The row-driver circuit 54 is coupled to the addressing lines 2 and the row-driver circuit is arranged to successively apply the control signals, via the respective addressing lines 2, to the thin-film transistors 3.

Column C1 contains two column-groups of sensor elements, i.e. the sensor elements 11, 31 form one column-group as the sensor elements 11,31 in this column-group are coupled to the same read-line. The sensor elements 21,41 form another column-group as the sensor elements 21, 41 are coupled to a different read-line. Similarly, in the column C2 the sensor elements 12, 32 form a column-group of sensor elements coupled to the same read-line and the sensor elements 22,42 form another column-group in column C2. For example, in row R2 the sensor elements 21,22 form a row-group of sensor elements coupled to the same read-line. The single sensor elements 23,24 in row R2 form another row-group. In the example shown in FIG. 1, the row-group of sensor elements 21,23 forms a row-section of sensor elements having their switching elements coupled to the same addressing line. Examples of row-sections are also shown in row R1 where the sensor elements 11, 13 form one row-section and the sensor elements 12,14 form another row-section. Note that in row R1 the sensor elements of the separate row-sections have their switching elements coupled to different addressing lines 2.

The serial image signal from the multiplex circuit 51 is applied to a post-processing unit 55. The post-processing unit 55 performs correction of the image signal for faults due to defective line conductors. The post-processing unit 55 is arranged to carryout such corrections by calibration of the sensor matrix. For example, the post processing unit 55 comprises a programmable memory in which the correction steps are stored.

Figure 2:
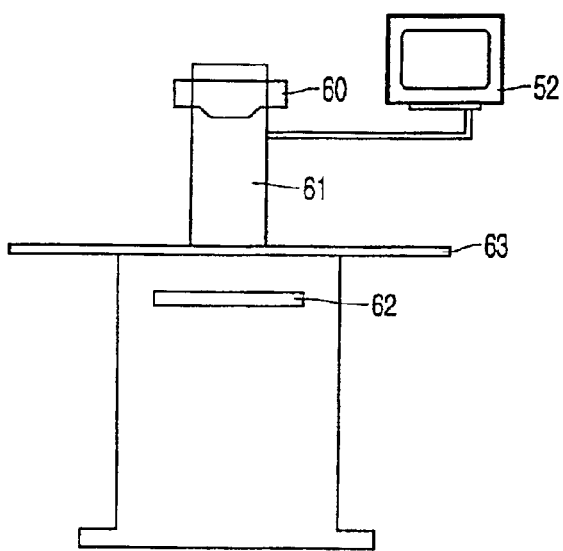
FIG. 2 is a schematic side elevation of an X-ray examination apparatus in which the image detector according to the invention is used.

FIG. 2 is a schematic side elevation of an X-ray examination apparatus in which the image detector according to the invention is used. The X-ray examination apparatus includes an X-ray source 60 which is mounted on a stand 61. On the stand there is also mounted a patient table 63. The X-ray examination apparatus is also provided with an X-ray detector 62 which is placed at the side of the patient table that is facing away from the X-ray source. The X-ray detector is provided with an image detector according to the invention. The image detector 4 itself is not visible in FIG. 2. Preferably, the X-ray detector is provided with a scintillation layer (e.g. a CsI:Tl layer) which converts X-rays into green light whereto the sensor elements of the image detector are sensitive. As an alternative the scintillator may be dispensed with when sensor elements that are sensitive to X-rays are employed. For example, thick α-Si:H photodiodes, having a thickness of a few millimetres, or α-Se or $PbO_x$ photoconductor sensor elements are suitable as X-ray sensitive sensor elements. The patient to be examined is placed on the patient table 63. In order to examine the patient, the patient is irradiated with an X-ray beam from the X-ray source. Owing to local differences in the X-ray absorption in the patient, the X-ray image is formed on the X-ray detector. The X-ray detector derives the image signal, for example, in the form of an electronic videosignal, and applies the image signal to the monitor 52. The image information of the X-ray image is displayed on the monitor on the basis of the image signal.

What is claimed is:

1. An image detector comprising:
   a sensor matrix which includes:
      a plurality of sensor elements for converting radiation into electrical charges;
      several line conductors;
      separate sensor elements being coupled to at least one of the line conductors; and
   the sensor elements being arranged in columns and rows,
   wherein separate groups of sensor elements in one column and/or in one row of the matrix are coupled to different line conductors, and at least one line conductor is coupled to sensor elements of at least two columns or of at least two rows, the line conductors including addressing lines and read lines,
   wherein in individual columns alternate sensor elements are coupled to the same read line,
   further comprising at least two read lines for detecting the electrical charges, separate sensor elements being coupled to at least one of the read lines,
   wherein sensor elements in individual columns are grouped in at least two column-groups of sensor elements and the sensor elements of the different groups in individual columns are coupled to different read lines, and wherein sensor elements in individual rows are arranged in several row-groups of at least two sensor elements, and in individual rows the sensor elements within one row-group are coupled to the same read-line.

2. An image detector as claimed in claim 1, wherein said individual row-groups consist of pairs of sensor elements in the relevant row and in adjacent columns.

3. An image detector as claimed in claim 1, wherein throughout the sensor matrix, in individual columns, sensor elements in alternating rows are coupled to alternating read lines such that no neighboring sensor elements in a column are coupled to the same read line.

4. An image detector as claimed in claim 1 further comprising individual sensor elements having individual switching elements with respective control electrodes, at least two addressing lines for applying control signals to the switching elements, and separate switching elements being coupled to at least one addressing line by way of their control electrodes, wherein sensor elements in individual rows are grouped in at least two row-sections, and in individual rows the switching elements of sensor elements of different row-sections are coupled to different addressing lines.

5. An image detector as claimed in claim 4, wherein sensor elements in individual columns are grouped in several column-sections of at least two sensor elements, in individual columns the switching elements of the sensor elements within one column-section are coupled to the same addressing line.

6. An image detector as claimed in claim 4, wherein throughout the sensor matrix, in individual rows, switching elements of sensor elements in alternating columns are coupled to alternating addressing lines such that no neighboring sensor elements in a row are coupled to the same addressing line.

7. An X-ray examination apparatus comprising:
an X-ray source for emitting an X-ray beam; and
an X-ray detector for receiving an X-ray image and deriving an image signal from the X-ray image;
wherein the X-ray detector is provided with an image detector as claimed in claim 1.

8. An image detector comprising:
a sensor matrix which includes:
a plurality of sensor elements for converting radiation into electrical charges;
several line conductors;
separate sensor elements being coupled to at least one of the line conductors; and
the sensor elements being arranged in columns and rows wherein separate groups of sensor elements in one column and/or in one row of the matrix are coupled to different line conductors, and at least one line conductor is coupled to sensor elements of at least two columns or of at least two rows, the line conductors including addressing lines and read lines,
wherein in individual rows, switching elements of alternate sensor elements are coupled to the same addressing line,
further comprising at least two read lines for detecting the electrical charges, separate sensor elements being coupled to at least one of the read lines,
wherein sensor elements in individual columns are grouped in at least two column-groups of sensor elements and the sensor elements of the different groups in individual columns are coupled to different read lines, and wherein sensor elements in individual rows are arranged in several row-groups of at least two sensor elements, and in individual rows the sensor elements within one row-group are coupled to the same read-line.

9. An image detector as claimed in claim 8, wherein said individual row-groups consist of pairs of sensor elements in the relevant row and in adjacent columns.

10. An image detector as claimed in claim 8, wherein throughout the sensor matrix, in individual columns, sensor elements in alternating rows are coupled to alternating read lines such that no neighboring sensor elements in a column are coupled to the same read line.

11. An image detector as claimed in claim 8 further comprising individual sensor elements having individual switching elements with respective control electrodes, at least two addressing lines for applying control signals to the switching elements, and separate switching elements being coupled to at least one addressing line by way of their control electrodes, wherein sensor elements in individual rows are grouped in at least two row-sections, and in individual rows the switching elements of sensor elements of different row-sections are coupled to different addressing lines.

12. An image detector as claimed in claim 11, wherein sensor elements in individual columns are grouped in several column-sections of at least two sensor elements, in individual columns the switching elements of the sensor elements within one column-section are coupled to the same addressing line.

13. An image detector as claimed in claim 8, wherein throughout the sensor matrix, in individual rows, switching elements of sensor elements in alternating columns are coupled to alternating addressing lines such that no neighboring sensor elements in a row are coupled to the same addressing line.

14. An X-ray examination apparatus comprising:
an X-ray source for emitting an X-ray beam;
an X-ray detector for receiving an X-ray image and deriving an image signal from the X-ray image;
wherein the X-ray detector is provided with an image detector as claimed in claim 8.

15. An image detector comprising:
a sensor matrix which includes:
a plurality of sensor elements for converting radiation into electrical charges;
several line conductors;
separate sensor elements being coupled to at least one of the line conductors; and
the sensor elements being arranged in columns and rows,
wherein separate groups of sensor elements in one column and/or in one row of the matrix are coupled to different line conductors, and at least one line conductor is coupled to sensor elements of at least two columns or of at least two rows, the line conductors including addressing lines and read lines,
wherein in individual columns alternate sensor elements are coupled to the same read line,
further comprising individual sensor elements having individual switching elements with respective control electrodes, at least two addressing lines for applying control signals to the switching elements, and separate switching elements being coupled to at least one addressing line by way of their control electrodes,
wherein sensor elements in individual rows are grouped in at least two row-sections, and in individual rows the switching elements of sensor elements of different row-sections are coupled to different addressing lines.

16. An image detector comprising:

a sensor matrix which includes:
- a plurality of sensor elements for converting radiation into electrical charges;
- several line conductors;
- separate sensor elements being coupled to at least one of the line conductors; and the sensor elements being arranged in columns and rows wherein separate groups of sensor elements in one column and/or in one row of the matrix are coupled to different line conductors, and at least one line conductor is coupled to sensor elements of at least two columns or of at least two rows, the line conductors including addressing lines and read lines, wherein in individual rows, switching elements of alternate elements are coupled to the same addressing line, further comprising individual sensor elements having individual switching elements with respective control electrodes, at least two addressing lines for applying control signals to the switching elements, and separate switching elements being coupled to at least one addressing line by way of their control electrodes, and wherein sensor elements in individual rows are grouped in at least two row-sections, and in individual rows the switching elements of sensor elements of different row-sections are coupled to different addressing lines.

17. An image detector comprising:

a sensor matrix which includes:
- a plurality of sensor elements for converting radiation into electrical charges;
- several line conductors;
- separate sensor elements being coupled to at least one of the line conductors; and the sensor elements being arranged in columns and rows wherein separate groups of sensor elements in one column and/or in one row of the matrix are coupled to different line conductors, and at least one line conductor is coupled to sensor elements of at least two columns or of at least two rows, the line conductors including addressing lines and read lines, wherein in individual rows, switching elements of alternate elements are coupled to the same addressing line, and wherein throughout the sensor matrix, in individual rows, switching elements of sensor elements in alternating columns are coupled to alternating addressing lines such that no neighboring sensor elements in a row are coupled to the same addressing line.

* * * * *